Oct. 16, 1934. J. A. SMITMANS Re. 19,343
SHEAR MECHANISM
Original Filed Jan. 30, 1932
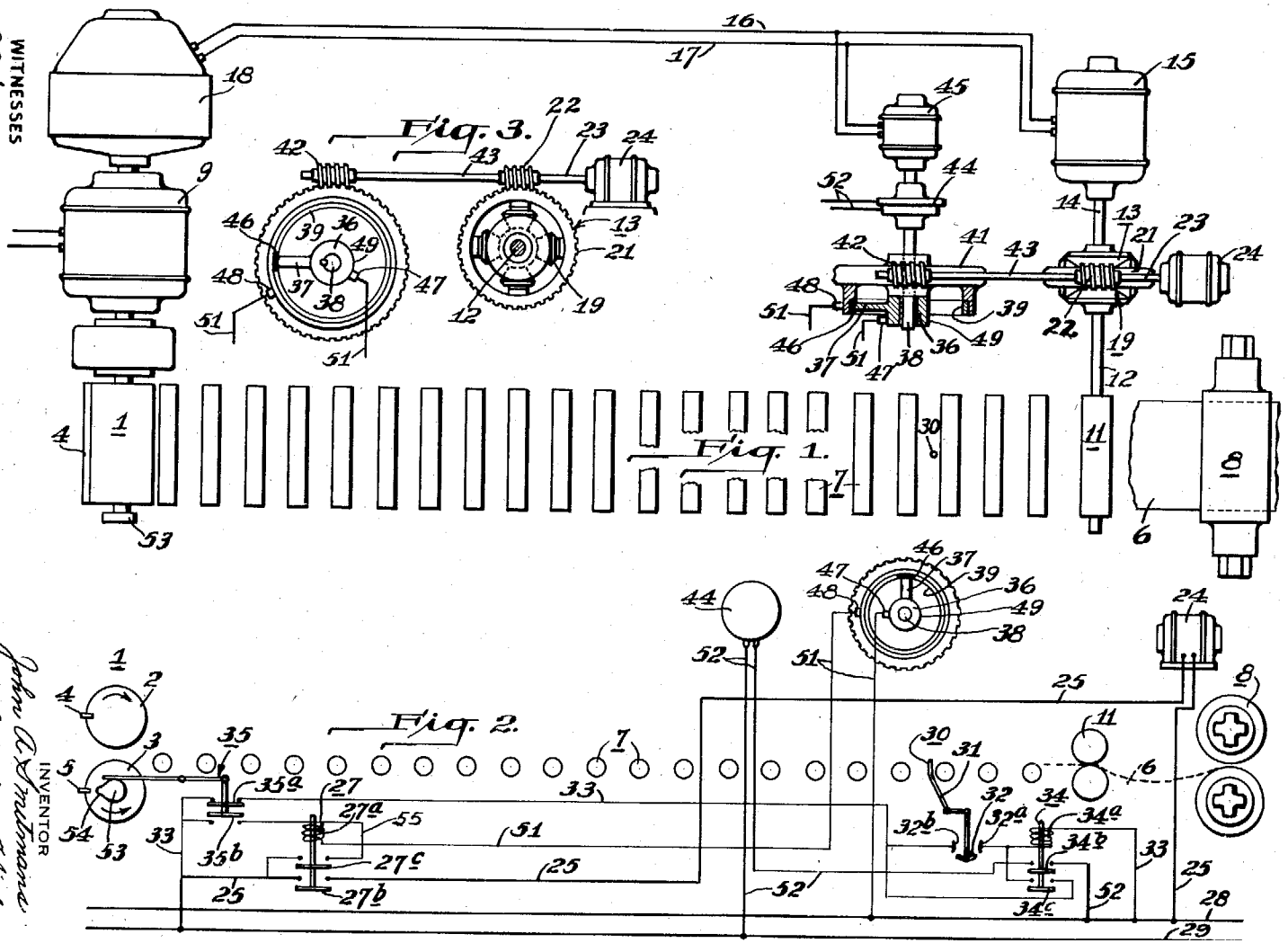
WITNESSES
A. B. Wallace
J. E. Dickinson
INVENTOR
John A. Smitmans
by Brown, Critchlow & Flick
his Attorneys Reissued Oct. 16, 1934

Re. 19,343

UNITED STATES PATENT OFFICE 19,343

SHEAR MECHANISM

John A. Smitmans, Pittsburgh, Pa., assignor to United Engineering & Foundry Company, Pittsburgh, Pa., a corporation of Pennsylvania Original No. 1,951,177, dated March 13, 1934, Serial No. 589,889, January 30, 1932. Application for reissue July 12, 1934, Serial No. 734,851

22 Claims. (Cl. 164—68)

This invention relates to the shearing of elongate stock, such as metal bars, strip and the like, into sections of predetermined lengths as it is delivered from a rolling mill or similar continuously operating feeding mechanism and has for its primary object the provision of an improved system of apparatus for accomplishing this end in which a continuously operated flying shear is utilized and which in addition to producing regular cuts of predetermined lengths is adapted to automatically control the length of the first cut made on each piece of stock whereby to reduce to a minimum the amount of waste customarily incurred by cropping cuts or random cutting.

A more particular object is to provide a system of apparatus of this character in which provision is made for automatically controlling the entrance in the shear of the leading end of each piece of stock delivered at random from a rolling mill or the like and for doing so in such a way as to determine the amount of material removed by the first cut without interfering with or altering the regular operation of the shear or rolling mill. This as will be readily appreciated is especially desirable where it is necessary to use a shear which is so heavy or cumbersome as to render it impractical to start and stop it or otherwise vary its speed to control the amount of material removed from a piece of stock by the first cut.

In addition to the aforementioned the invention has various other objects all of which as well as its various other novel features and advantages will be clearly apparent when the following detailed description is read in conjunction with the accompanying drawing of which Fig. 1 is a plan view of a single embodiment of the invention; Fig. 2 a schematic wiring diagram of a control system therefor; and Fig. 3 an elevational view of the speed changing differential unit and synchronizing switch utilized in the system.

Referring to the drawing the numeral 1 designates a flying shear which in accordance with the invention may be any of a number of well known forms of shear, but shown as a rotary type comprising a pair of carriers 2 and 3 equipped with cooperating blades 4 and 5 which are arranged to operate upon pieces of stock such as the piece 6 as it is delivered thereto over a feed roll table 7 by a rolling mill 8. This is a typical form of setup commonly employed in steel mills for cutting elongate blanks into sections of predetermined lengths as they are delivered from the rolling mill and by means of which the lengths of the cuts are determined by the relation which the speed of the shear bears to the speed of the blanks.

Ordinarily the shear is driven continuously by a suitable motor, such as motor 9, at a speed which is regulated by any suitable means in accordance with the speed of the mill from which the stock to be sheared is delivered. Thus the shear is adapted to produce cuts at regular intervals and the length of the cuts is determined by the amount of material passing through the shear during such intervals. A difficulty commonly present in such systems is that the stock is usually delivered from the mill at random and as no control is customarily exercised over the first cuts, considerable waste is incurred, since under such conditions the first cuts vary in length all the way from nothing up to the regular lengths of the cuts.

To eliminate this difficulty in accordance with this invention a pair of pinch rolls 11 is arranged to engage the stock at a suitable point between the rolling mill and the shear and is so operated as to control the entrance of the leading end of the stock in the shear in such a way as to get it in step with the cutting blades and in that way determine the amount of material removed from the front end of each piece of stock by the first cut. For operating rolls 11 they are coupled by a shaft 12, a differential gear unit 13 and a shaft 14 to a driving motor 15.

For normal operation, motor 15 is adapted to drive rolls 11 at a peripheral speed which imparts to the stock the linear speed required to give the length of cuts desired. Toward this end it may be controlled in any suitable fashion, but to insure this, as illustrated here, a synchronous motor is employed and this is connected by conductors 16 and 17 to receive its operating power from a synchronous generator 18 which is coupled to and driven by shear motor 9, hence providing positive synchronous operation of the shear and pinch rolls when the latter are driven by motor 15 alone.

In order that rolls 11 may be utilized to control the entrance of the front end of each piece of stock in the shears and thereby control the length of the first cut the differential gear unit 13 is employed. To utilize it in such capacity its planetary section 19 is mounted in a worm gear 21 and this in turn meshed with a worm 22 mounted on a shaft 23 that is connected to a motor 24. Consequently by operating this latter motor the planetary section 19 of gear unit 13 may be driven and the speed of shaft 12 and rolls 11 thereby altered without varying the speed of motor 15. Obviously by driving motor 24 in alternate directions the speed of strip 6 may be either increased or decreased above or below its normal speed and in that way the front end of each piece of stock may be got in step with the cutting blades of the shear to control the length of the first cut without altering the speed or regular operation of the shear.

As shown here the strip is fed to the pinch rolls 11 directly from the working rolls of mill 8 and accordingly the pinch rolls are normally run at the same peripheral speed as the mill, and as a result it is impossible to increase the speed of the strip by increasing the speed of rolls 11, hence motor 24 is adapted in this set-up for operation in one direction only and that to slow up the stock to get its front end in step with the cutting blades. The slowing up of the stock by rolls 11 will of course result in the formation of a loop between the pinch rolls and the rolling mill as shown by the dotted lines in Fig. 2, but with the proper spacing of the pinch rolls from the mill this involves no difficulty.

In order to control the operation of motor 24 so that it will automatically vary the operation of rolls 11 in such a way as to get the leading end of each piece of stock in step with the cutting blades 4 and 5 it is connected in a circuit 25 extended from a suitable source of current supply 28 and 29 through a bridging member 27*b* on a magnetic contactor 27, and the following control is provided for controlling the operation of contactor 27.

For initiating the operation of the control circuit used with motor 24 a flag switch 30 is arranged in the path of the stock on the delivery side of rolls 11 and by any suitable means is adapted for adjustment towards or away from these rolls to provide the proper starting of the motor 24 under different conditions of operation such as results from variations in the speed of the stock as will presently appear. While various forms of switches of this character may be employed the one illustrated is shown as comprising a pivoted lever 31 disposed to be engaged by the stock as it passes thereover. On the lower end of this lever 31 there is mounted a bridge member 32 which is adapted to normally rest in an inoperative position below a pair of contacts 32*a* and 32*b* when the switch is not engaged by the stock and to be moved to and held in a similar position above such contacts when the stock engages the lever and to complete a current-conducting circuit between such contacts for an instant only when it is being moved upwardly therebetween. Such bridge is also adapted to complete no circuit through these contacts when it is permitted to fall to its lower inoperative position by the stock passing out of engagement with the lever 31. Further details of this switch are deemed unnecessary inasmuch as such switches are so well known in the art.

As shown the contacts 32*a* and 32*b* of flag switch 30 are connected in a circuit traced from supply conductor 28 by way of a conductor 33 through the actuating coil 34*a* of a magnetic contactor 34, contacts 32*a*, and 32*b*, a bridging member 35*a* on a limit switch 35 to supply conductor 29. Hence if bridging member 35*a* of switch 35 is closed, as it normally is as will presently appear, when the end of a piece of stock hits flag 30, the actuating coil 34*a* of contactor 34 is energized and that contactor closed. This latter contactor is employed for setting in motion the means employed for measuring the distance the rolls 11 must be retarded or turned backward in order to place the end of the strip in step with the shear blades.

While such stock measuring means may take other form, in this embodiment of the invention a flying or synchronizing switch 36 is employed for such purpose. Referring more particularly to Figs. 1 and 3 switch 36 comprises a rotary brush element 37 which is mounted on a shaft 38 and a cooperating ring element 39 on which the brush rides which is secured to a worm gear 41 that in turn is loosely mounted on shaft 38 and meshed with a worm 42 secured to an extension 43 of shaft 23 to which motor 24 is connected. Accordingly ring element 39 is driven by motor 24 whenever the latter is actuated and the distance it is turned is proportionate to the amount of turning imparted to rolls 11 by such motor. Shaft 38 in turn is connected through a magnetic clutch 44 to a synchronous motor 45 which like motor 15 is connected to conductors 16 and 17. Hence the driving element of clutch 44 is driven in synchronism with shear 1 and hence with the normal speed of the stock. Obviously the same result would be obtained by connecting the driving element of clutch 44 to motor 15.

To utilize switch 36 for controlling motor 24 to get the leading end of the stock in step with the cutting blades of the shear a piece of insulating material 46 is mounted in ring 39 to break the circuit between it and brush 37 when the latter engages the insulating material and a pair of brushes 47 and 48 respectively are arranged to ride on the hub 49 of brush 37 which is secured to shaft 38 but suitably insulated therefrom and on the periphery of ring 39. These brushes 47 and 48 as shown in Fig. 2 are connected in a circuit 51 traced from supply conductor 28 through brushes 47 and 48, the actuating coil 27*a* of magnetic contactor 27 and a normally open interlock 35*b* on flag switch 35 to supply conductor 29.

For operating clutch 44 it is connected in a circuit 52 traced from supply conductor 28 through a bridging member 34*b* on magnetic contactor 34, and the actuating coil of the clutch (not shown) to supply conductor 29. Consequently when flag 30 is operated and contactor 34 closed clutch 44 is energized and starts shaft 38 to rotate in synchronism with rolls 11 and shear 1. With the closing of bridge 32 and the completion of the circuit through contacts 32*a* and 32*b* a holding circuit is established for coil 34*a* which is traced from contact 32*a* through a second bridging member 34*c* on contactor 34 to contact 32*b*. Hence clutch 44 remains energized until limit switch 35 is operated to open bridge 35*a*.

This latter switch 35 as shown comprises bridging elements 35*a* and 35*b* which are connected to a pivoted lever 35 that in turn is arranged to rest at one end on a cam 53 coupled to the lower drum 3 of shear 1. On this cam there is provided a raised portion 54 which is adapted to lift the outer end of lever 35 when engaged thereby and open bridge 35*a* and close bridge 35*b* and accomplishes this once with each rotation of drum 3. As referred to above bridge 35*a* in opening breaks circuit 33 and deenergizes clutch 44 to thereby stop shaft 38. At the same time the closing of bridge 35*b* completes circuit 51 which causes contactor 27 to close and it in turn energizes circuit 25 starting motor 24. These latter circuits once energized are both maintained energized, until the insulating block 46 on ring 39 of switch 36 is moved into engagement with brush 48, by a holding circuit 55 traced about bridge 35*b* of switch 35 through a bridge 27*c* on switch 27 this being necessary inasmuch as switch 35 only closes bridge 35*b* for an instant.

The operation of the invention is as follows;

with mill 8 operating at a certain speed motor 9 is adjusted to operate shear 1 at the speed required to give the length of cuts desired. Switch 30 is then positioned with respect to shear 1 so as to determine the length of the first cut and to also insure switch 36 and motor 24 having adequate time to make the necessary corrections to the advancement of the front end of the stock to get it in step with blades 4 and 5 before it reaches the shear, so that after the first cut the lengths of cuts will be uniform. In other words switch 30 must be timed to be so operated with respect to switch 35 as to determine the length of the first cut and at the same time spaced sufficiently distant from the shear to afford motor 24 adequate time after switch 30 is operated by the stock to make its correction and be out of service before the stock reaches the shear.

With these adjustments made, when the front end of a piece of stock strikes flag 30 it causes circuit 33 to be energized, whereupon through the closing of contactor 34 clutch 44 is energized. This starts and causes shaft 38 and brush 37 to rotate in synchronism with the strip until stopped by the opening of bridge 35*a* on limit switch 35 which is operated by cam 53. Thus as cam 53 has a definite setting with respect to the position of the cutting blades on shear 1, brush 37 of switch 36 is caused to travel a distance from its starting point which is proportionate to the distance which the end of the stock travels past flag 30 before switch 35 operates, or in other words a distance which is proportionate to the length the first cut would have in excess of that desired if the stock were permitted to enter the shear at its regular speed and as will presently appear brush 37 starts each time the switch is operated from engagement with the insulating section 46 of ring 39.

With the opening of bridge 35*a* on switch 35 bridge 35*b* is closed. Thus as soon as clutch 44 is deenergized circuit 51 is completed. With the completion of this circuit the bridging members 27*b* and 27*c* are closed, and the circuit 25 energized, the latter bridging members completing circuit 55 which holds the contactor closed until deenergized by the operation of switch 36. When circuit 25 is completed motor 24 is set in motion and in a direction to retard the speed of pinch rolls 11. With the starting of motor 24 the planetary section 19 of gear unit 13 is, as stated, moved in a direction to retard the speed of the pinch rolls while the ring 39 which is attached by worm gear 41 to motor 24 is turned in the opposite direction to that of the movement of the brush 37 and the distance which the planetary section 19 of the gear unit is displaced by motor 24 is determined by the distance brush 37 is displaced from the insulation 46. Hence the angular distance which motor 24 causes shaft 12 and rolls 11 to be displaced less than they normally are is determined by the distance brush 37 is angularly displaced from the insulation 46. This is brought about by the motor 24 being stopped as soon as the insulation 46 is moved by worm gear 41 into contact with brush 37 which breaks circuit 51. This occurs when the end of the stock is brought in step with the cutting blades of the shear for the first cut.

In simpler terms by the aforementioned system motor 24 is so regulated by switches 30, 35, and 36 that it is adapted to cause rolls 11 to rotate a peripheral distance less than normal when motor 24 is operated which is equal to the distance which the stock must be retarded after it leaves the pinch rolls and before it enters the shear to bring the stock into the shear at the proper time to give the proper length of first cut desired.

With the switch 30 actuated by the strip to a circuit open position so long as it is in contact therewith circuit 33 cannot be reenergized after contactor 34 falls open until switch 30 is released and reenergized. Hence such circuit is established only once with the passage through the system of each piece of stock and each time it is interrupted brush 37 of switch 36 is in engagement with the insulating block 46 and in readiness for the next step.

To insure that all cuts after the first one be of regular length it is necessary that the stock be traveling at its regular speed when the first and all succeeding cuts are made. To accomplish this as stated above switch 30 is spaced sufficiently from the shear to allow the control system and motor 24 to have adequate time to perform their duties and be out of service before the first cut is made. Obviously this spacing may be altered in accordance with the speed of motor 24.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically illustrated and described.

I claim:

1. In combination with a continuously operated flying shear, means for feeding stock thereto, a pair of pinch rolls arranged between said shear and said feeding means to engage the stock and normally operated continuously in synchronism with said shear, and means under the joint control of the stock and shear for varying the operation of said pinch rolls between the time they engage the stock and the stock is engaged by the shear to control the length of the first cut.

2. In combination a continuously operated flying shear, means for feeding stock into the shear, a pair of pinch rolls arranged between said shear and feeding means to engage the stock, means for normally driving the pinch rolls in synchronism with the shear, means for varying the speed of the pinch rolls and the entrance of the stock in the shear, and means controlled jointly by the front end of the stock and the shear for controlling the operation of said speed-varying means to thereby selectively determine the length of the first cut.

3. In combination with a flying shear, a pair of pinch rolls for feeding stock to the shear, means for normally driving said pinch rolls in synchronism with the shear, and means set in motion by the leading end of a piece of stock fed at random to the shear by the feeding means for measuring the extent to which such end of the stock is out of step with the shear, means for varying the speed of said pinch rolls to control the entrance of the leading end of the stock in the shear, and means controlled by the shear for deenergizing said speed-varying means for determining the length of the first cut.

4. In combination with a continuously operated flying shear, means for feeding stock to the shear, means for normally driving the feeding means in synchronism with the shear, means for varying the speed of the feeding means, and means jointly responsive to the front end of the stock and the shear for controlling the period of operation of said speed-varying means to thereby selectively control the entrance into the shear of a piece of stock delivered thereto by the feeding means in timed relation with the cutting operation of the shear.

5. In combination with a continuously operated flying shear, means for feeding stock to the shear, means for normally driving the feeding means in synchronism with the shear, means interposed between said driving means and said feeding means for varying the speed of the feeding means, a motor for operating said speed-varying means, and means jointly responsive to said shear and the front end of the stock for so controlling the operation of said motor as to selectively determine the length of the first cut.

6. For use in combination with a rolling mill, a continuously operated flying shear arranged to operate upon the stock delivered from said mill to cut it into sections of predetermined lengths, and means arranged between said shear and mill for automatically controlling the entrance in the shear of the front end of each piece of stock delivered from the mill to the shear.

7. For use in combination with a rolling mill, a flying shear arranged to operate upon stock delivered from said mill, means for continuously driving said shear at a substantially constant speed, and means interposed between the mill and the shear for automatically retarding the forward movement of the leading end of each piece of stock delivered from the mill until it is properly synchronized with the shear to thereby result in the production of a first cut of predetermined length and then feeding it at a constant speed to the shear.

8. In combination a continuously operated flying shear, means for delivering stock to said shear, means for normally driving said stock-delivering means in synchronism with said shear to control the lengths of the cuts produced by the shear, and means responsive to the stock and shear for measuring the length the first cut would have if the stock is fed at random from the feeding means into the shear, and means controlled jointly by said shear and said measuring means for retarding said feeding means sufficiently to get the leading end of the stock in step with the shear before it reaches the shear to control the length of the first cut.

9. For use in combination with a rolling mill, a continuously operated flying shear for cutting a piece of stock into sections of predetermined length as it is delivered from said mill, a pair of pinch rolls arranged between said mill and shear to engage the stock, means for driving said pinch rolls, means for varying the speed of said pinch rolls, and means jointly responsive to the front end of the stock and said shear for controlling the operation of said speed-varying means to thereby exercise such a control over the entrance of the stock in the shear as to produce a first cut of predetermined length.

10. In combination with a flying shear, feeding means for delivering blanks of stock to the shear, a synchronous motor coupled through a differential gear unit to said feeding means, a motor for driving said shear, a synchronous generator coupled to be driven by said shear motor and electrically connected to said synchronous motor, means coupled to said differential gear unit for varying the speed of said feeding mechanism without the speed of said synchronous motor being altered, and means responsive to said shear and the stock delivered thereto for controlling the operation of said speed-varying means.

11. In combination with a continuously operated flying shear, a pair of pinch rolls for delivering stock to said shear, means for driving said pinch rolls in synchronism with said shear, a differential gear unit interposed between said pinch roll driving means and the pinch rolls, means for operating said gear unit to vary the speed of the pinch rolls without varying the speed of said driving means, means jointly responsive to the strip and shear for measuring what the length which the first cut would be if fed at random into the shear, and means controlled by said measuring means for controlling the operation of said gear unit speed varying means to determine the length of the first cut.

12. In combination a continuously operated flying shear, a pair of pinch rolls for feeding stock to said shear, means connecting said pinch rolls to a driving motor through a differential gear unit, driving means coupled to said gear unit for varying the speed of said pinch rolls without the speed of said pinch roll driving motor being altered, a flag switch arranged between said pinch rolls and said shear to be engaged by a piece of stock when passed thereover, stock-measuring means set in motion by said flag switch and driven in synchronism with the normal speed of said pinch rolls, a limit switch operated by said shear in definite relation with its cutting period, means responsive to said limit switch for stopping said stock-measuring means whereby measuring the amount of stock traveling past said flag between the time it is operated and said limit switch is operated, means also set in motion with said limit switch for setting said gear unit speed-varying means in operation, and means cooperating with said stock-measuring means operated by said speed-varying means for stopping said speed-varying means.

13. In combination a flying shear comprising a pair of cooperating blades mounted on a pair of rotatable carriers, means for driving said carriers continuously, a pair of pinch rolls for delivering stock to said shear, means for driving said pinch rolls in synchronism with said shear, a switch arranged between said shear and said pinch rolls to be operated by the passage thereover of a piece of stock, means set in motion by said flag when operated which is adapted to measure the amount of stock passing the flag while said means is in motion, a limit switch arranged to be operated by said shear, means responsive to said limit switch for rendering said stock-measuring means inoperative, other means set in motion by said limit switch for retarding the forward delivery motion of said pinch rolls, and means cooperating with said stock-measuring means for rendering said roll-retarding means inoperative when the amount of material delivered by the rolls has been decreased an amount less than that normally delivered which is equal to the length of material passing said flag while said stock-measuring means is in operation.

14. In combination a flying shear equipped with cutting blades, a motor for driving said shear, a pair of pinch rolls for delivering stock to said shear, a synchronous motor for driving said pinch rolls, a synchronous generator mechanically coupled to be driven by said shear motor and electrically connected to said synchronous motor to provide for driving said pinch rolls in synchronism with said shear, a differential gear unit comprising sun gears and planetary gears interposed between said synchronous motor and said pinch rolls, a worm gear supporting said planetary gears, a motor connected by a worm to said worm gear for varying the operation of said pinch rolls with respect to said synchronous motor, a flag switch arranged between said pinch rolls and said shear to be operated by the stock delivered by the pinch rolls, a magnetic clutch arranged to be energized by said flag switch, a second synchronous motor connected to said synchronous generator operably coupled to the driving element of said clutch, an electrical control element coupled to the driven element of said clutch, a limit switch mounted for operation by said shear adapted to deenergize said clutch and stop the control element operated thereby when it is actuated, other means operated by said limit switch for starting said gear-operating motor, and means operated thereby arranged to cooperate with said control element for stopping said gear motor.

15. In combination, a flying shear equipped with cooperating blades, means for driving said shear at a uniform speed, means spaced from the shear for feeding stock into it, means for varying the speed of said stock-feeding means, means connected to be driven in timed relation with said shear for controlling the operation of said speed-varying means, means operated by the stock for setting said means for controlling said speed-varying means in operation, means operated by the shear for stopping said control means, and means operated by said speed-varying means for stopping itself.

16. In combination with a continuously operated flying shear, means for continuously feeding web thereinto, means for varying the speed of said feeding means, and means jointly responsive to said web and said shear for controlling the operation of said speed-varying means in such a manner as to synchronize the entrance of the leading end of the web into the shear with the cutting elements thereof.

17. In combination with a continuously operated flying shear, means for feeding stock to the shear, means for normally driving said feeding means in synchronism with the shear, means for varying the speed of the feeding means, and means jointly responsive to the front end of the stock and shear disposed to so control the operation of said speed-varying means as to thereby selectively control the entrance into the shear of a piece of stock delivered thereto by the feeding means in timed relation with the cutting operation of the shear.

18. In combination with a continuously operated flying shear, means for delivering web into said shear, and means jointly responsive to the leading end of the web and the shear for modifying the movement of the web into the shear to control the length of the first cut.

19. In combination with a continuously operated flying shear, means for feeding web thereinto, means for varying the speed of said feeding means, and means jointly responsive to the front end of the web and the shear for controlling the operation of said speed-varying means to thereby control the length of the first or cropping cut.

20. In combination with a continuously operated flying shear provided with cooperating cutting elements, means for feeding web material into said shear, and means responsive to the front end of the web and shear for determining the extent to which the front end of a web fed at random to the shear is out of step with the movement of said cutting elements into cutting opposition.

21. In combination with a continuously operated flying shear provided with cooperating cutting elements, means for feeding an elongate web into said shear, means responsive to the front end of the web and shear for determining the extent to which such end of a piece of web fed at random to the shear is out of step with the movement of said cutting elements into cutting opposition, and means responsive to said last-mentioned means for modifying the speed of said feeding means before the web reaches the shear to selectively control the length of the first cut.

22. In a method of rolling and cropping material, the steps comprising driving a flying shear in predetermined relationship to the delivery speed of a mill, modifying the delivery of the front end of the stock to the shear to place it in predetermined relationship with the movement of the cutting elements of the shear into cutting opposition, and then delivering said stock to the shear at the delivery speed of the mill.

JOHN A. SMITMANS.